(12) United States Patent
Hsieh et al.

(10) Patent No.: US 11,148,607 B1
(45) Date of Patent: Oct. 19, 2021

(54) FOLDABLE POSITIONING STRUCTURE AND BICYCLE CARRIER INCLUDING THE SAME

(71) Applicant: KING ROOF INDUSTRIAL CO., LTD., Taichung (TW)

(72) Inventors: Chun-Yi Hsieh, Taichung (TW); Chun-I Wu, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/002,332

(22) Filed: Aug. 25, 2020

(51) Int. Cl.
*B60R 9/00* (2006.01)
*B60R 9/10* (2006.01)
*B60R 9/045* (2006.01)

(52) U.S. Cl.
CPC ............... *B60R 9/10* (2013.01); *B60R 9/045* (2013.01)

(58) Field of Classification Search
CPC .................................. B60R 9/10; B60R 9/045
USPC .......................................................... 224/309
See application file for complete search history.

(56) References Cited

U.S. PATENT DOCUMENTS

| | | | | |
|---|---|---|---|---|
| 5,950,891 | A * | 9/1999 | Brungardt | B60R 9/10 224/497 |
| 6,123,498 | A * | 9/2000 | Surkin | B60R 9/06 224/509 |
| 9,096,182 | B1 * | 8/2015 | Roth | B60R 9/06 |
| 9,102,280 | B1 * | 8/2015 | Crawford | B60R 9/10 |
| 9,371,042 | B1 * | 6/2016 | Dratewski | B60R 9/06 |
| 9,555,744 | B1 * | 1/2017 | Roth | B60R 9/06 |
| 9,802,549 | B1 * | 10/2017 | Shen | B60R 9/06 |
| 10,040,326 | B1 * | 8/2018 | O'Connell | B60D 1/46 |
| 10,183,627 | B1 * | 1/2019 | Liu | B60R 9/10 |
| 10,906,473 | B1 * | 2/2021 | Yu | B60R 9/06 |
| 2011/0049208 | A1 * | 3/2011 | Wang | B60R 9/10 224/520 |
| 2014/0027484 | A1 * | 1/2014 | Loken | B60R 9/10 224/497 |
| 2014/0151421 | A1 * | 6/2014 | Loken | B60R 9/10 224/519 |
| 2015/0224837 | A1 * | 8/2015 | Anyan | B60R 9/10 280/504 |
| 2016/0068111 | A1 * | 3/2016 | Walker | B60R 9/06 224/521 |
| 2016/0200157 | A1 * | 7/2016 | Marmon | B60D 1/58 280/491.3 |
| 2016/0229350 | A1 * | 8/2016 | Ziv | B60R 9/06 |

(Continued)

*Primary Examiner* — Peter N Helvey
(74) *Attorney, Agent, or Firm* — Muncy, Geissler, Olds & Lowe, P.C.

(57) ABSTRACT

A foldable positioning structure and a bicycle carrier including the same is provided. The foldable positioning structure is for being mounted on a main body of a bicycle carrier, the main body includes a first rod member and a second rod member which are rotatably connected with each other, the foldable positioning structure includes an abutting assembly, a controlling assembly and a linkage. The abutting assembly is disposed on the second rod member and movable relative to the second rod member. The controlling assembly is rotatably disposed on the second rod member and slidable relative to the second rod member, and the controlling assembly has an engaging portion which is radially disposed thereon. The linkage is connected to and between the abutting assembly and the controlling assembly.

10 Claims, 11 Drawing Sheets

(56) References Cited

U.S. PATENT DOCUMENTS

| | | | |
|---|---|---|---|
| 2017/0001573 A1* | 1/2017 | Inagaki | B60R 9/06 |
| 2017/0253188 A1* | 9/2017 | Shen | B60R 9/10 |
| 2017/0267187 A1* | 9/2017 | Rarey | B60R 9/048 |
| 2017/0327053 A1* | 11/2017 | Anderson | B60R 9/10 |
| 2018/0072237 A1* | 3/2018 | Kuschmeader | B60R 9/10 |
| 2019/0351837 A1* | 11/2019 | Murray | B60D 1/155 |
| 2020/0156724 A1* | 5/2020 | Kuschmeader | B62H 3/12 |
| 2020/0198546 A1* | 6/2020 | Casagrande | B60R 9/045 |
| 2020/0369216 A1* | 11/2020 | Hill | B60R 9/06 |
| 2020/0406825 A1* | 12/2020 | Wang | B60R 9/048 |
| 2020/0406829 A1* | 12/2020 | Wang | B60R 9/06 |
| 2021/0170955 A1* | 6/2021 | Nusbaum | B60R 9/10 |
| 2021/0197729 A1* | 7/2021 | Yoon | B60R 9/10 |

\* cited by examiner

FOLDABLE POSITIONING STRUCTURE AND BICYCLE CARRIER INCLUDING THE SAME

BACKGROUND OF THE INVENTION

Field of the Invention

The present invention relates to a foldable positioning structure and a bicycle carrier including the same.

Description of the Prior Art

In the modern society, people like to participate in outdoor activities on holidays to relax, so in recent years, it is popular to place a bicycle on a bicycle carrier to be connected to a body of a vehicle. Conventionally, the bicycle carrier has a fixing rod, one of two ends of the fixing rod is pivoted to a connecting rod which is connected to the body of the vehicle, the other of the two ends of the fixing rod has a carrying rod which extends along a direction lateral to the fixing rod, the carrying rod is configured to mount and position the bicycle, the fixing rod is pivoted to the connecting rod, so it requires an abutting structure to prevent the fixing rod and connecting rod from swinging randomly. However, the abutting structure tends to move up and down when the vehicle is on the road, and the abutting structure will therefore get loose, so the fixing rod and the connecting rod may swing relative to each other to further cause the bicycle to fall off.

The present invention has arisen to mitigate and/or obviate the afore-described disadvantages.

SUMMARY OF THE INVENTION

The major object of the present invention is to provide a foldable positioning structure and a bicycle carrier including the same, which can prevent the foldable positioning structure from getting loose due to ups and downs when a vehicle is on the road, and it is safer to use the foldable positioning structure.

To achieve the above and other objects, a foldable positioning structure is provided, for being mounted on a main body of the bicycle carrier, the main body including a first rod member and a second rod member which are rotatably connected with each other, including an abutting assembly, a first elastic member, a controlling assembly and a linkage. The abutting assembly is disposed on the second rod member and movable relative to the second rod member to be on a first position or a second position. One of two ends of the first elastic member is engaged with one of the first rod member and the second rod member, and the other of the two ends of the first elastic member is engaged with the abutting assembly so that the abutting assembly has a tendency to move toward the first position. The controlling assembly is rotatably disposed on the second rod member around an axis and axially slidable relative to the second rod member to be on a locked position or a released position, and the controlling assembly has an engaging portion which is radially disposed thereon. The linkage is connected to and between the abutting assembly and the controlling assembly. When the abutting assembly is on the first position, the abutting assembly is configured to be engaged with the first rod member to make the first rod member non-swingable relative to the second rod member; when the abutting assembly moves to the second position, the abutting assembly is disengaged from the first rod member so that the first rod member is swingable relative to the second rod member. When the controlling assembly is on the locked position, the engaging portion is configured to be engaged with the second rod member, and controlling assembly is non-rotatable relative to the second rod member; when the controlling assembly moves to the released position, the engaging portion is disengaged from the second rod member, the controlling assembly is rotatable relative to the second rod member, and the controlling assembly is rotated to drive the linkage to make the linkage drive the abutting assembly to move to the second position.

To achieve the above and other objects, a bicycle carrier is further provided, including the foldable positioning structure, the bicycle carrier further includes a main body, the main body includes a first rod member and a second rod member which are rotatably connected with each other, one of the first rod member and the second rod member has a carrier for carrying a bicycle, and the other of the first rod member and the second rod member is assembled to a mounting rod of a vehicle.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
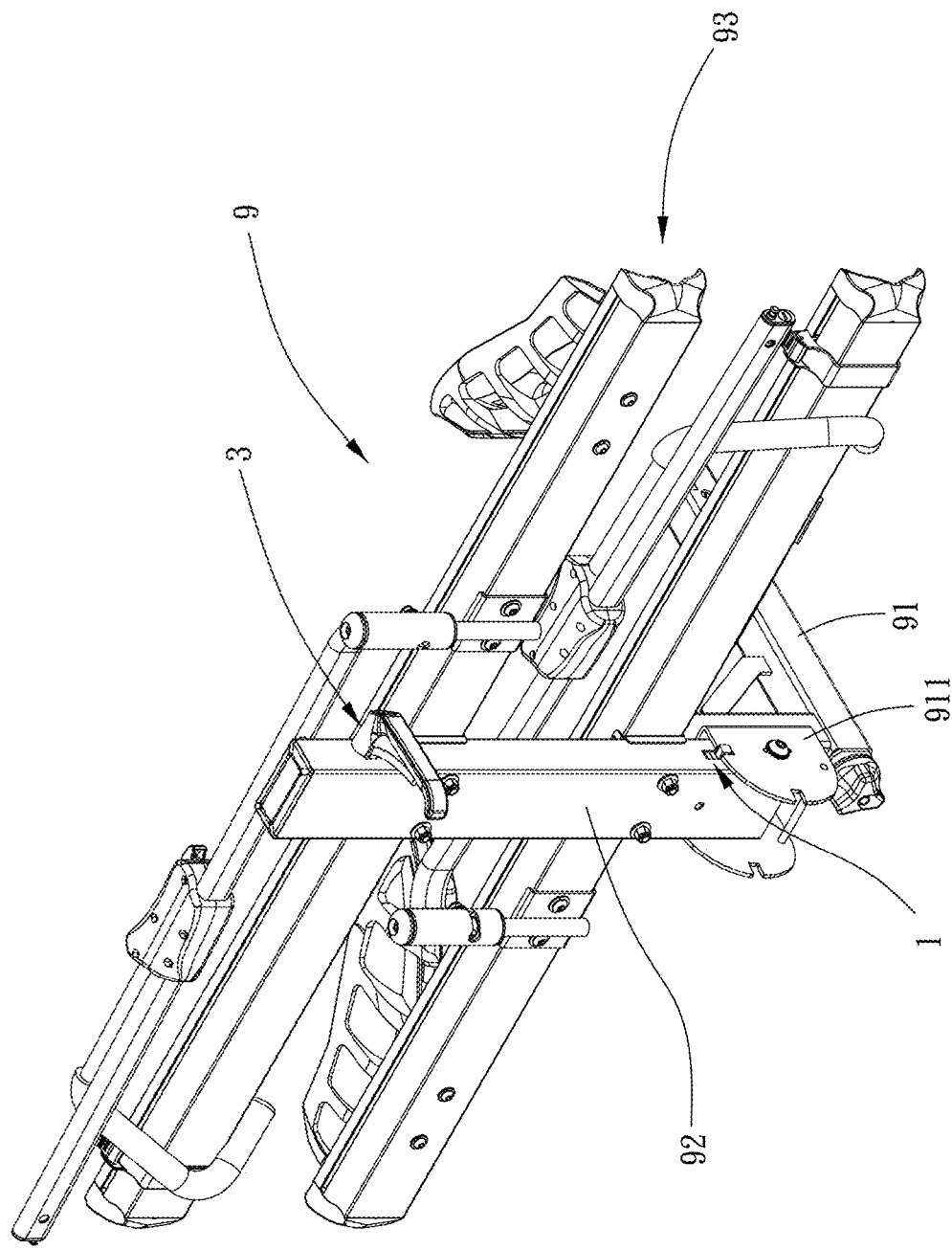
FIGS. 1 and 2 are stereograms of a preferred embodiment of the present invention.
Figure 2:
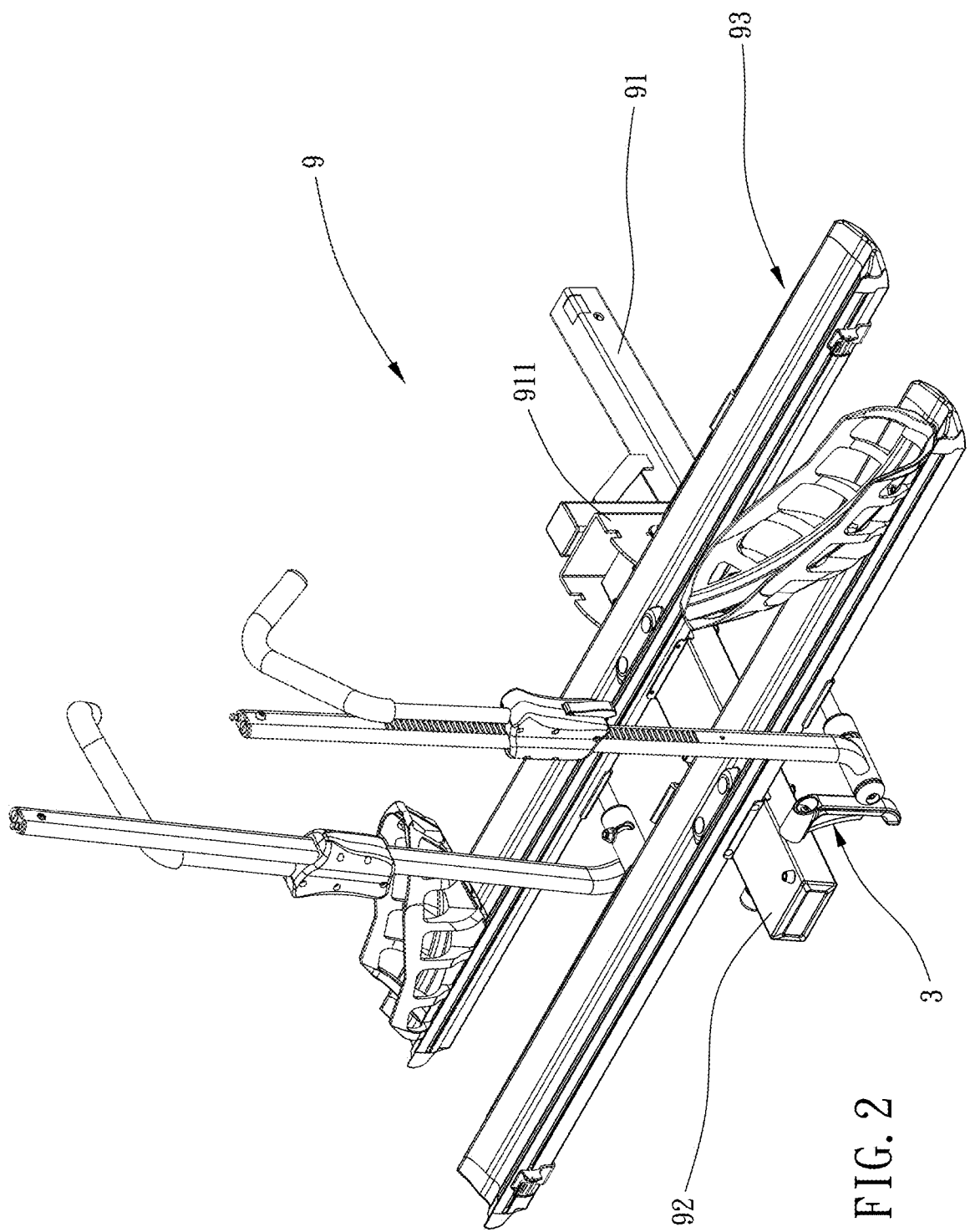
Figure 3:
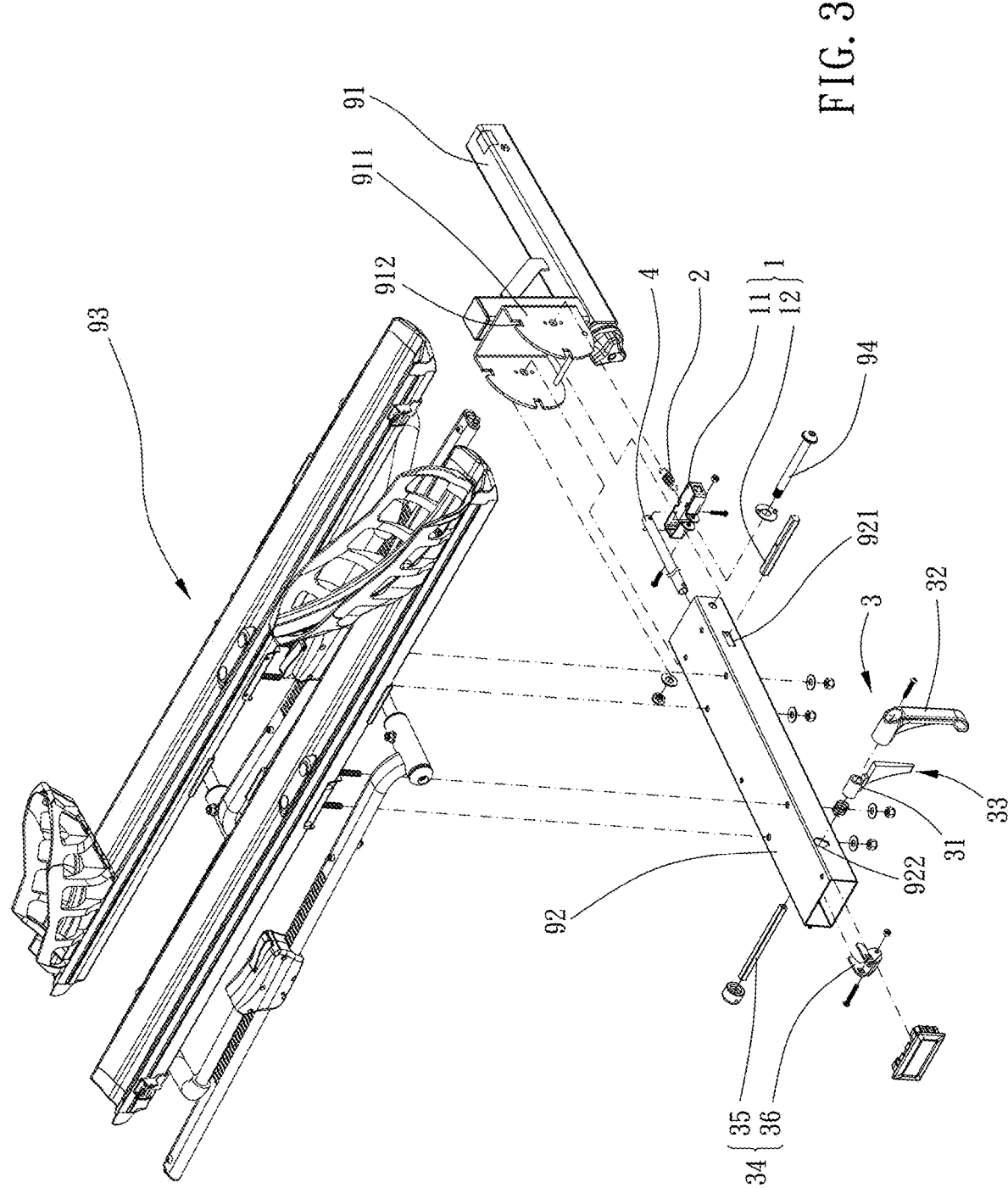
FIGS. 3 and 4 are breakdown views of the preferred embodiment of the present invention.
Figure 4:
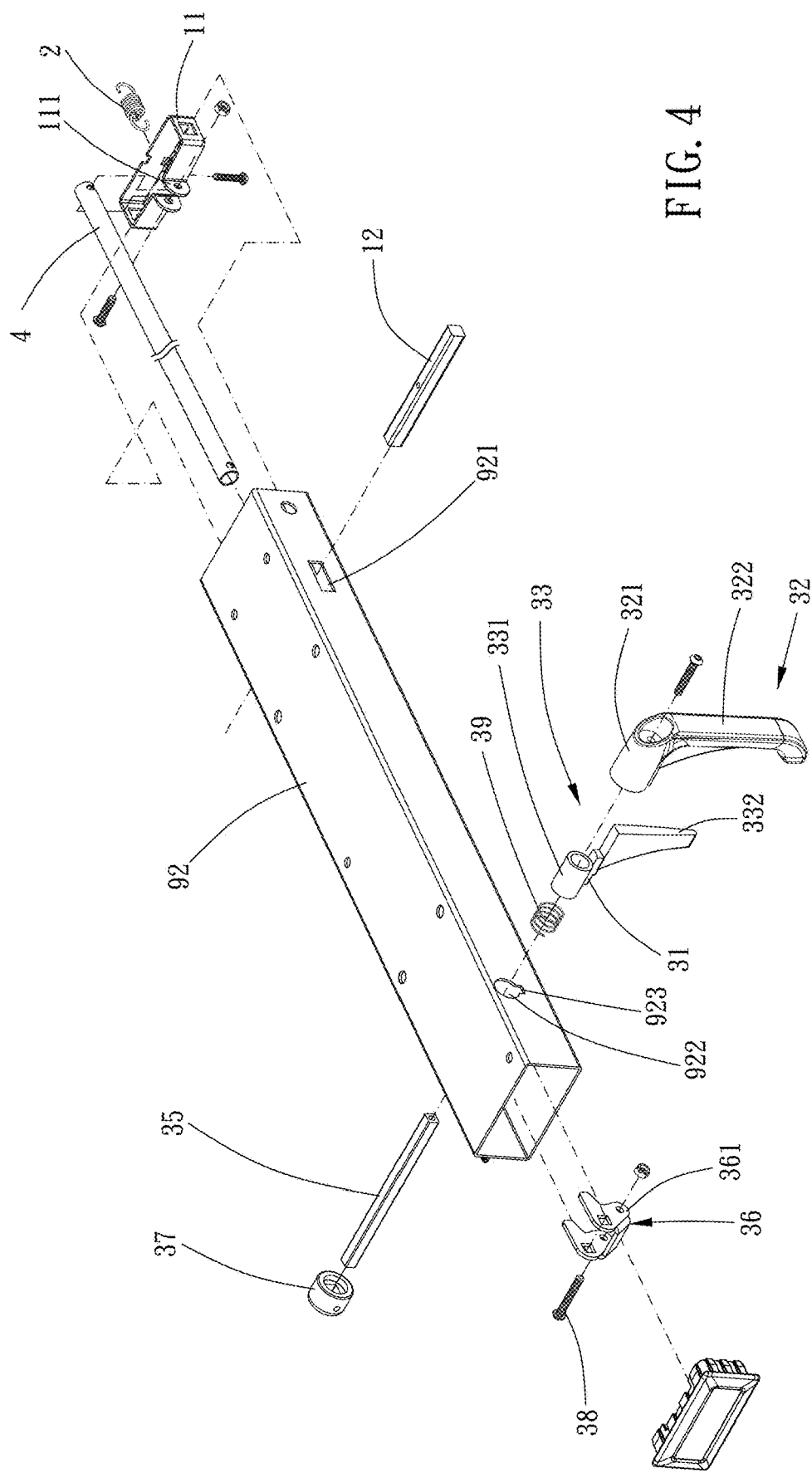

The present invention will be clearer from the following description when viewed together with the accompanying drawings, which show, for purpose of illustrations only, the preferred embodiment in accordance with the present invention.

Please refer to FIGS. 1 to 11 of a preferred embodiment. A foldable positioning structure is provided for being mounted on a main body 9 of a bicycle carrier, the main body 9 includes a first rod member 91 and a second rod member 92 which are rotatably connected with each other, and the foldable positioning structure includes an abutting assembly 1, a first elastic member 2, a controlling assembly 3 and a linkage 4.

The abutting assembly 1 is disposed on the second rod member 92 and movable relative to the second rod member 92 to be on a first position or a second position.

One of two ends of the first elastic member 2 is engaged with one of the first rod member 91 and the second rod member 92, and the other of the two ends of the first elastic member 2 is engaged with the abutting assembly 1 so that the abutting assembly 1 has a tendency to move toward the first position.

The controlling assembly 3 is rotatably disposed on the second rod member 92 around an axis and axially slidable relative to the second rod member 92 to be on a locked position or a released position, and the controlling assembly 3 has an engaging portion 31 which is radially disposed thereon.

The linkage 4 is connected to and between the abutting assembly 1 and the controlling assembly 3 to allow the abutting assembly 1 and the controlling assembly 3 to co-move with each other.

Figure 7:
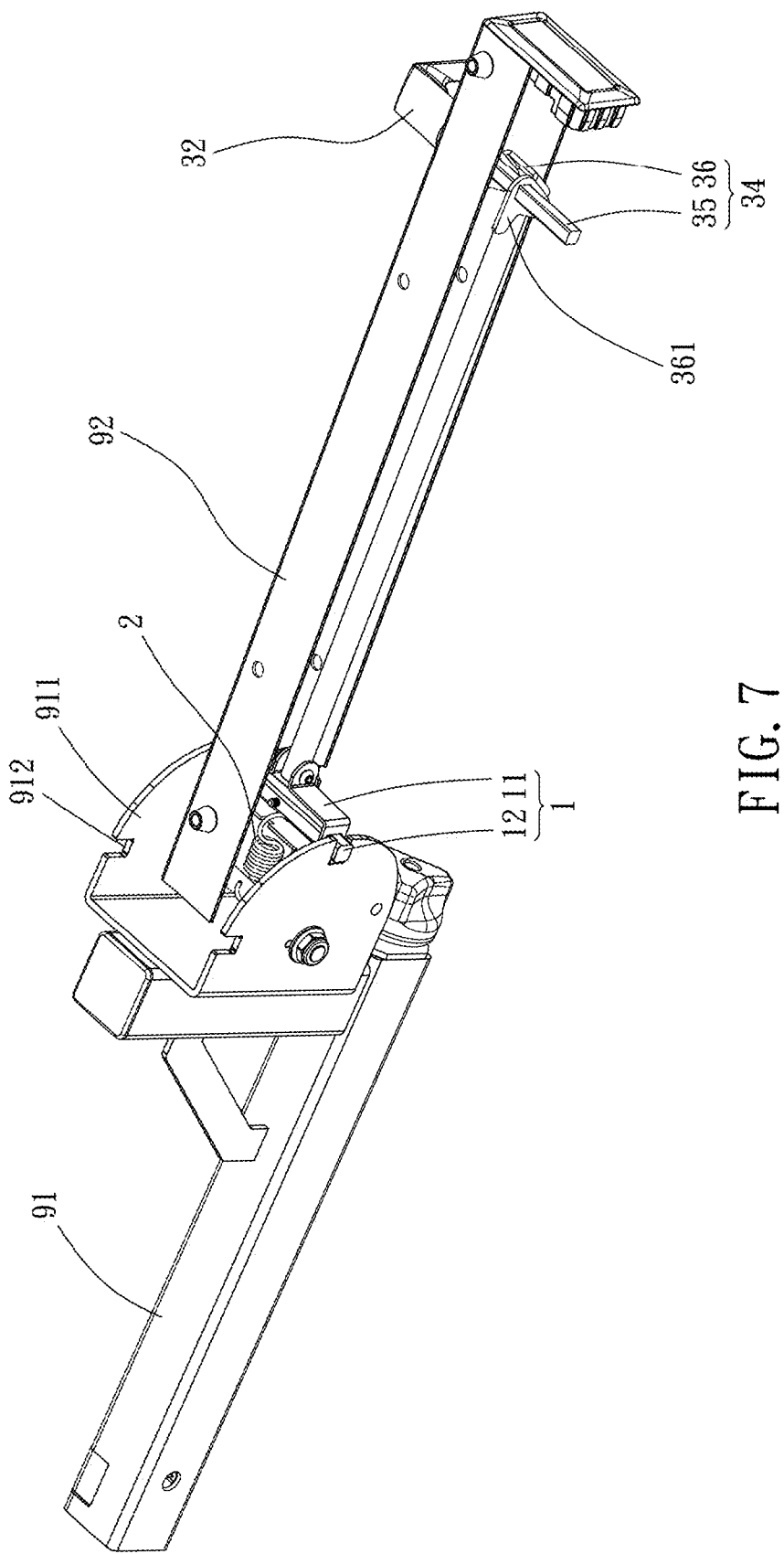
FIGS. 7 and 8 are cross-sectional stereograms of the preferred embodiment of the present invention in use.
Figure 8:
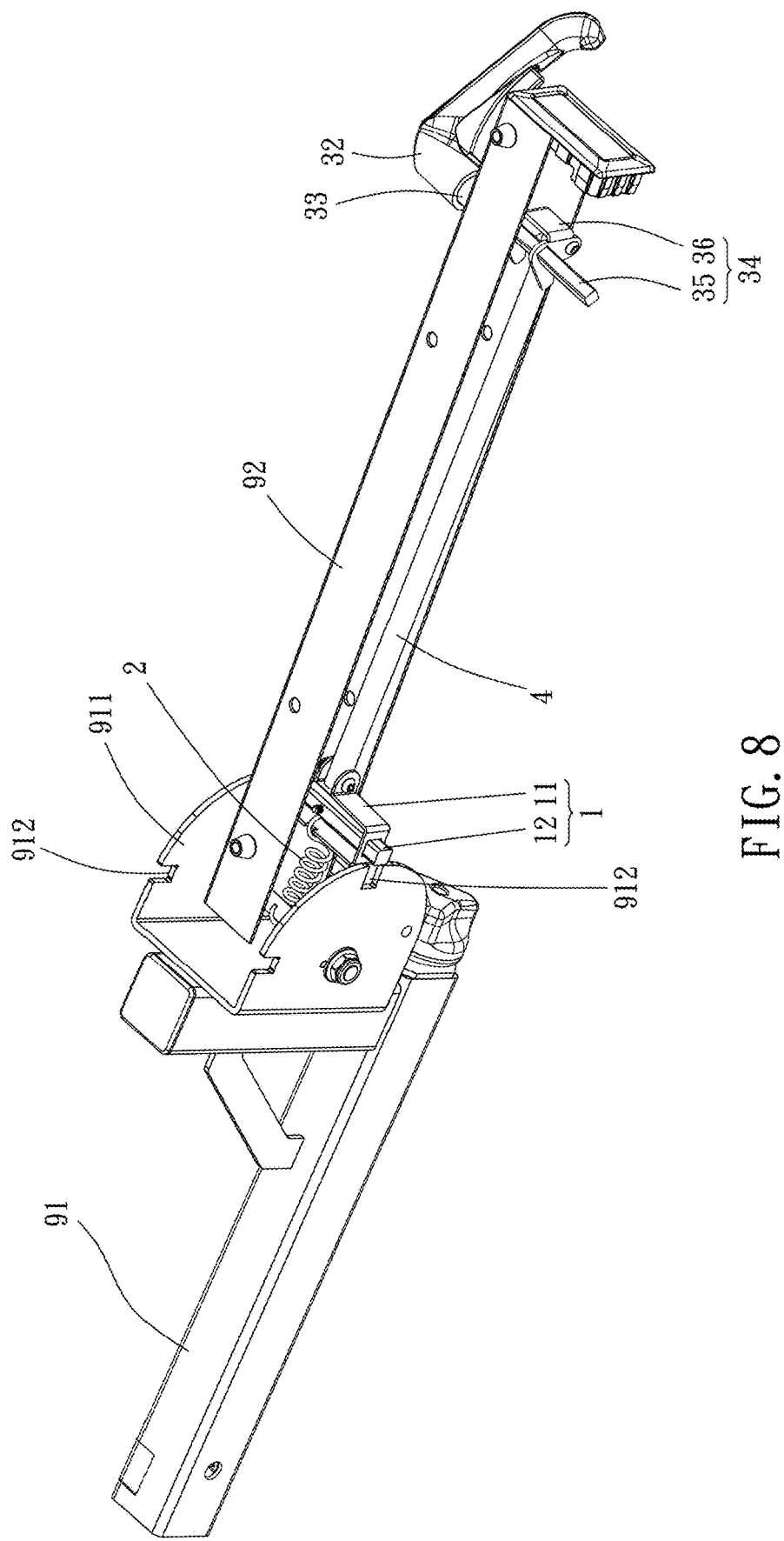
Figure 9:
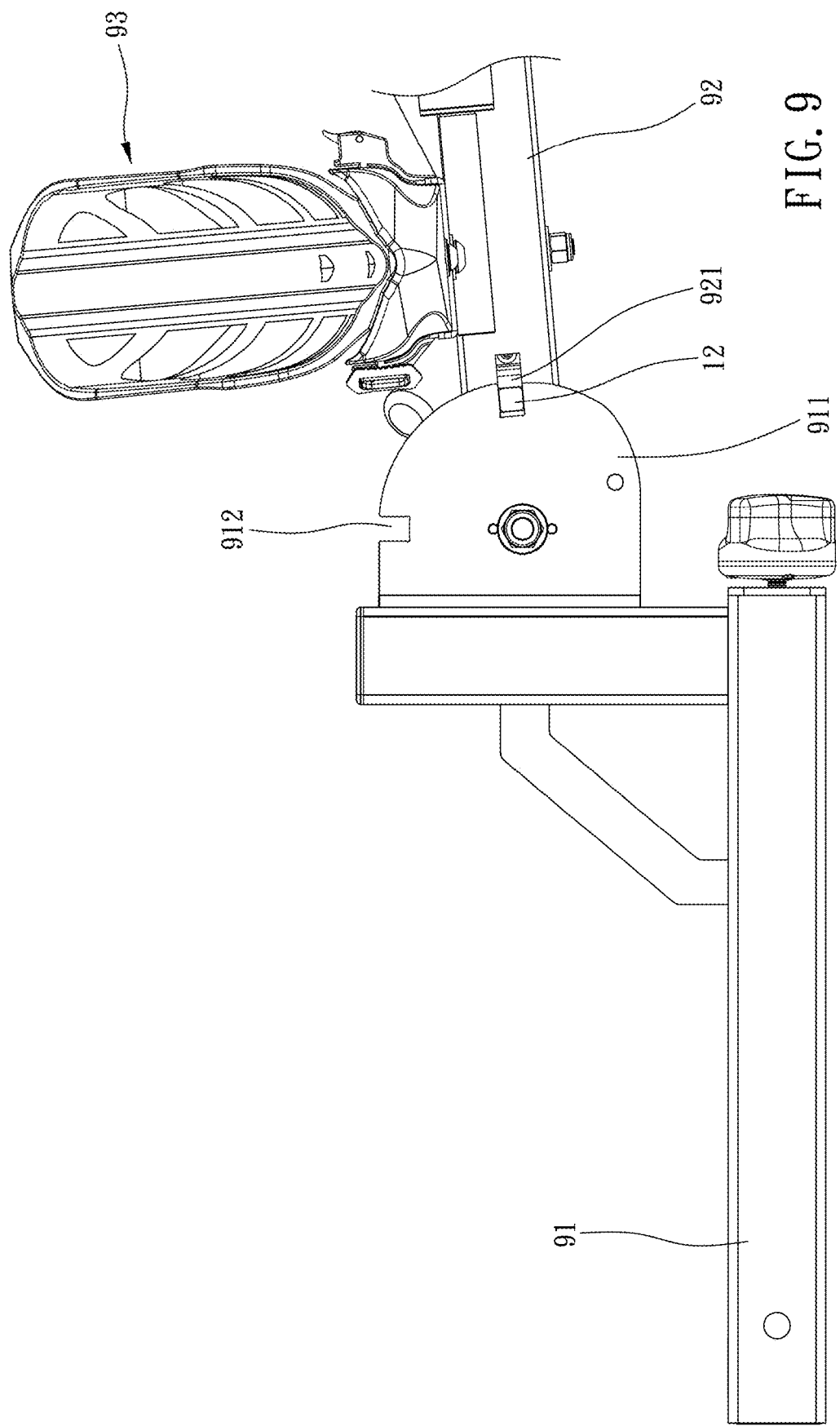
FIGS. 9 to 11 are side views of the preferred embodiment of the present invention in use.
Figure 10:
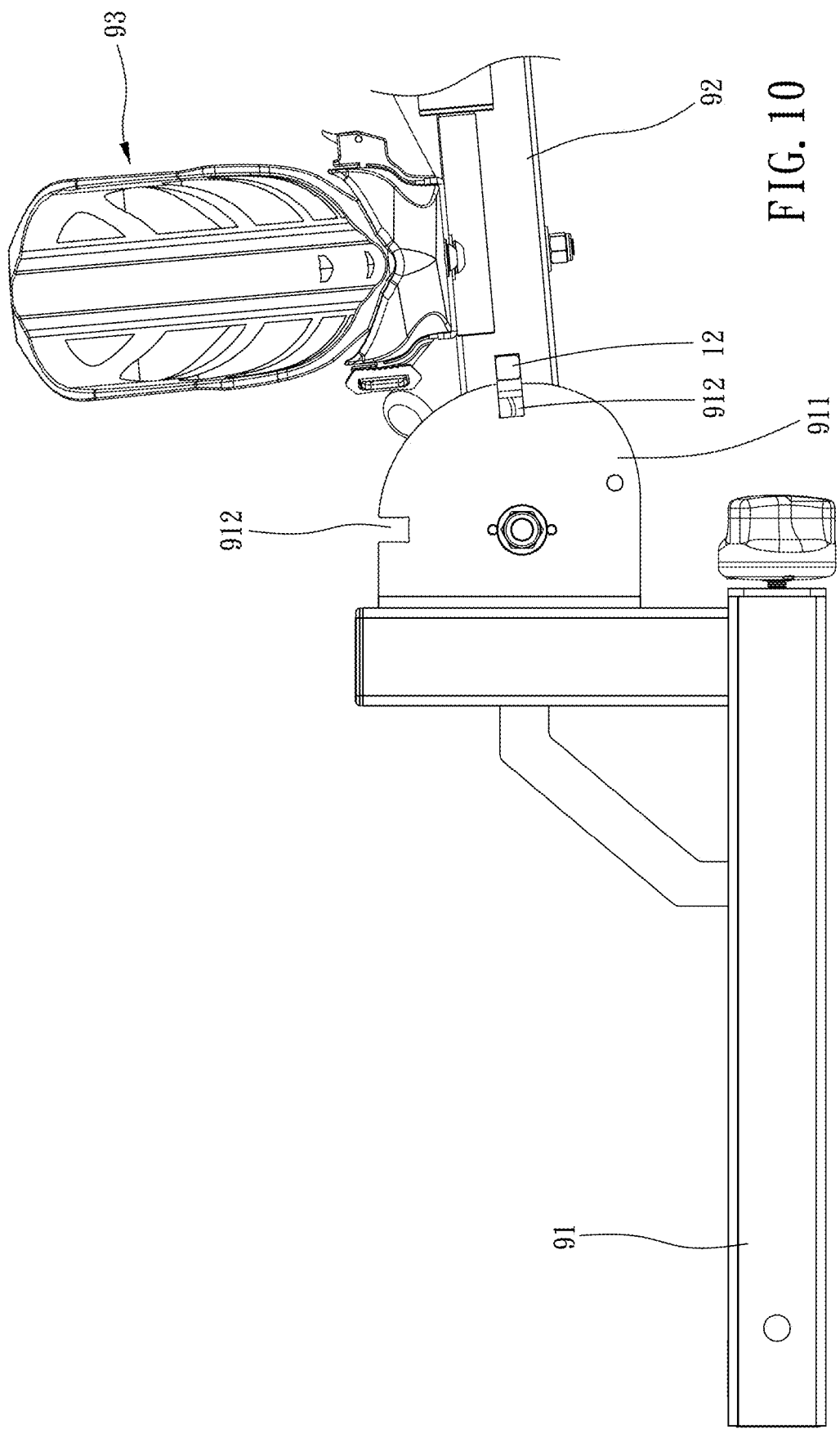

When the abutting assembly 1 is on the first position, the abutting assembly 1 is configured to be engaged with the first rod member 91 (as shown in FIGS. 7 and 9) to make the first rod member 91 non-swingable relative to the second rod member 92; when the abutting assembly 1 moves to the second position, the abutting assembly 1 is disengaged from the first rod member 91 (as shown in FIGS. 8 and 10) so that the first rod member 91 is swingable relative to the second rod member 92.

Figure 5:
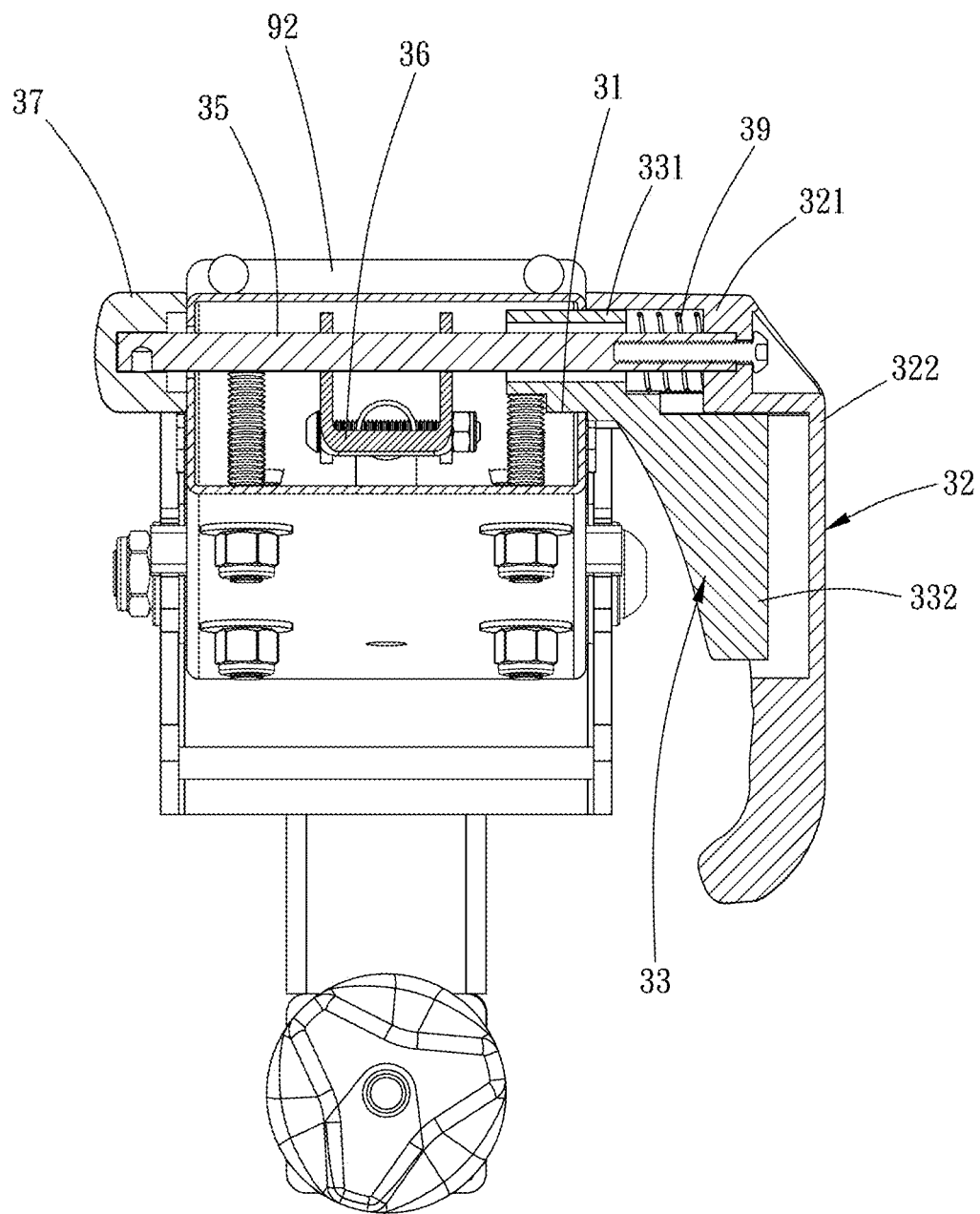
FIGS. 5 and 6 are cross-sectional front view of the preferred embodiment of the present invention in use.
Figure 6:
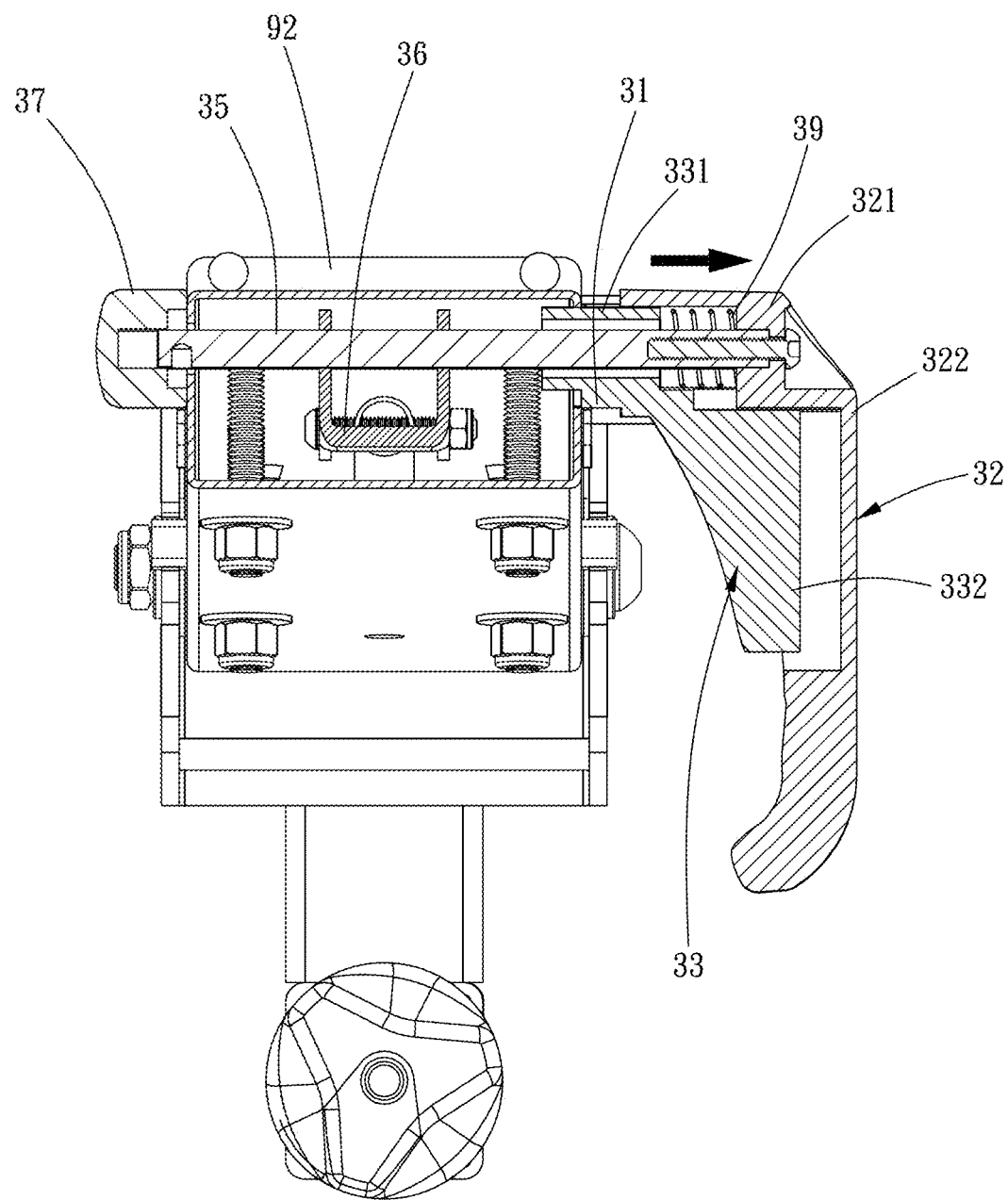

When the controlling assembly 3 is on the locked position (as shown in FIG. 5), the engaging portion 31 is configured to be engaged with the second rod member 92, and controlling assembly 3 is non-rotatable relative to the second rod member 92; when the controlling assembly 3 moves to the released position (as shown in FIG. 6), the engaging portion 31 is disengaged from the second rod member 92, the controlling assembly 3 is rotatable relative to the second rod member 92, and the controlling assembly 3 is rotated to drive the linkage 4 to make the linkage 4 drive the abutting assembly 1 to move to the second position. Given the above, in the foldable positioning structure, when a user wants swing the first rod member 91 and the second rod member 92, s/he has to operate the controlling assembly 3 to move to the released position to make the engaging portion 31 detached from the second rod member 92 so as to operate the controlling assembly 3 to rotate and make the abutting assembly 1 to move to the second position. Therefore, when the vehicle is on the road, the abutting assembly 1 can be prevented from rotating the controlling assembly 3 accidentally, so the first rod member 91 and the second rod member 92 will not swing relative to each other.

Specifically, the second rod member 92 has a slot 921, the abutting assembly 1 is disposed within the slot 921, the abutting assembly 1 includes a connecting member 11 and an engaging member 12, the engaging member 12 is disposed through the connecting member 11 and within the slot 921, in this embodiment, the slot 921 is a rectangular slot, the engaging member 12 is a rectangular rod so as to prevent the engaging member 12 from rotating relative to the first rod member 91, the connecting member 11 is respectively connected to the first elastic member 2 and the linkage 4, and the engaging member 12 is slidable to be on the first position or the second position to be optionally engaged with the first rod member 91, so the connecting member 11 can control the engaging member 12 to move via the linkage 4. In this embodiment, the connecting member 11 is U-shaped and has two first ear pieces 111, the linkage 4 is pivoted to the two first ear pieces 111, and the first elastic member 2 is connected to one end of the connecting member 11 remote from the linkage 4.

Figure 11:
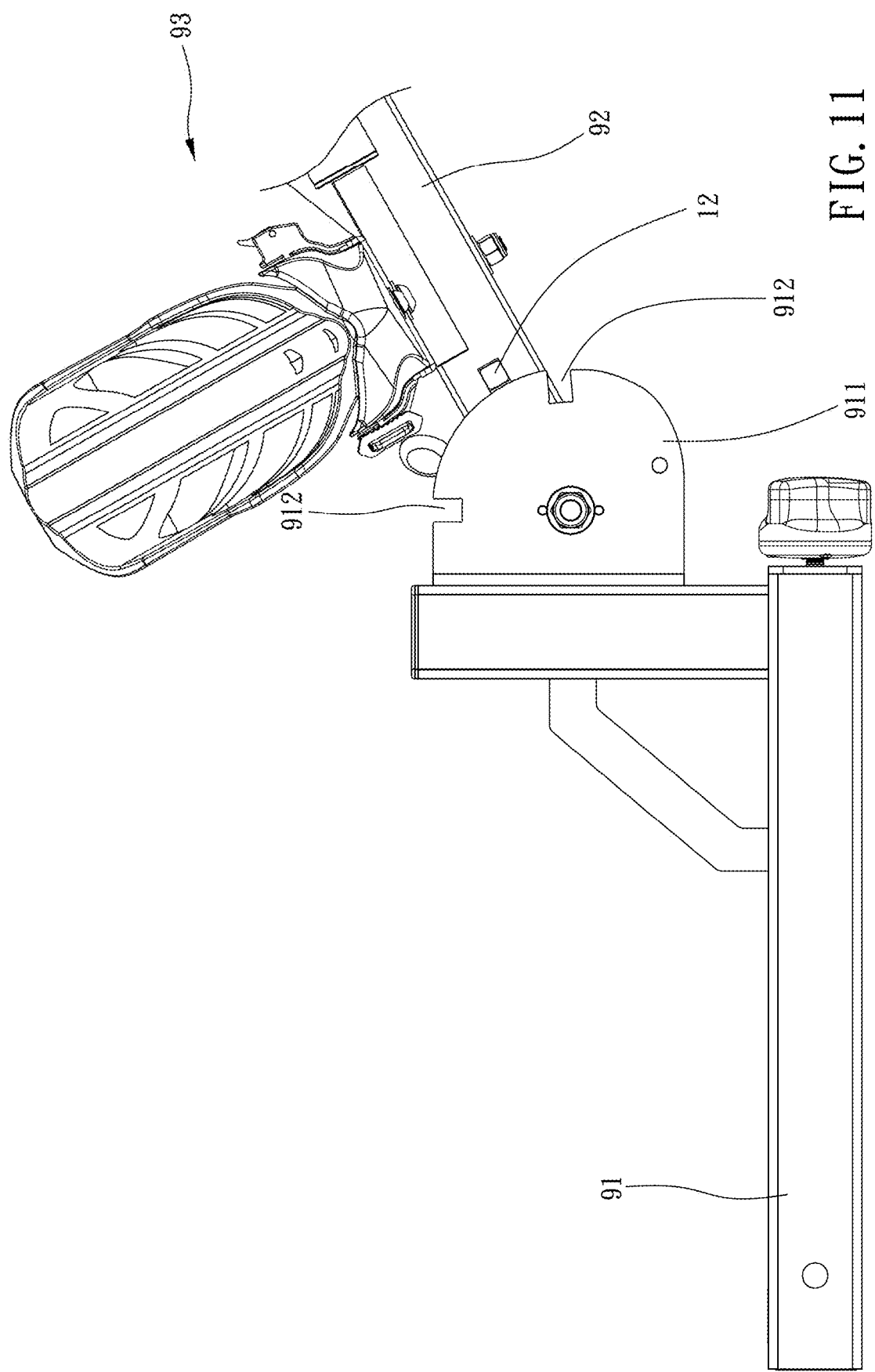

Specifically, in this embodiment, the first rod member 91 has two side plates 911, the second rod member 92 is pivoted to the two side plates 911 via a first axle 94, one of the two ends of the first elastic member 2 is connected to the first axle 94, each said side plate 911 has at least two grooves 912, in this embodiment, each said side plate 911 has two said grooves 912, when the engaging member 12 is on the first position, the engaging member 12 is received within one of the at least two grooves 912 of the two side plates 911, the first rod member 91 is non-swingable relative to the second rod member 92; when the engaging member 12 is on the second position, the engaging member 12 is non-engaged with either groove 912 of the two side plates 911, the engaging member 12 is movable along a circumference of the two side plates 911 (as shown in FIG. 11), and the first rod member 91 is swingable relative to the second rod member 92.

In addition, the controlling assembly 3 includes a handle 32 and a lock member 33, the lock member 33 has the engaging portion 31 which is radially disposed thereon, the handle 32 is rotatable relative to the second rod member 92 around the axis, and the lock member 33 is non-rotatably disposed within the handle 32 and movable on the axis to be on the locked position or the released position, so when the user wants to detach the engaging portion 31 from the second rod member, s/he only needs to move the lock member 33 without pulling the handle 32. In this embodiment, the controlling assembly 3 further includes a rotating member 34, the second rod member 92 has a pivot hole 922, the rotating member 34 is disposed through the pivot hole 922 to be fixedly connected to the handle 32, the linkage 4 is connected to the rotating member 34, and when the lock member 33 moves to the released position, the handle 32 can be rotated to drive the rotating member 34 to rotate and drive the linkage 4 to move.

More specifically, the rotating member 34 includes a rotating rod 35 and a driving member 36, the rotating rod 35 is disposed through the pivot hole 922 and the driving member 36 to be fixedly connected to the handle 32, the rotating rod 35 is rotatable relative to the second rod member 92, the lock member 33 is sleeved on the rotating rod 35, the driving member 36 has two second ear pieces 361, and the two second ear pieces 361 are pivoted to the linkage 4 so that the driving member 36 can rotate and drive the linkage 4 to move. Preferably, the rotating rod 35 is a rectangular rod, one end of the rotating rod 35 remote from the handle 32 has a blocking member 37, and the blocking member 37 abuts against one end of the second rod member 92 remote from the handle 32 to prevent the handle 32 from moving along the axis. In this embodiment, the linkage 4 is a circular tube, and two ends of the linkage 4 are respectively pivoted to the two first ear pieces 111 and the two second ear pieces 361 via a second axle 38 so that the linkage 4 is movable with the driving member 36 and the connecting member 11.

The pivot hole 922 further has a notch 923, when the lock member 33 is on the locked position, the engaging portion 31 is received within the notch 923, when the lock member 33 is on the released position, the engaging portion 31 is detached from the notch 923, and the lock member 33 and the handle 32 have a second elastic member 39 therebetween to bias the lock member 33 toward the locked position normally to prevent the engaging portion 31 from being detached from the notch 923.

In this embodiment, the handle 32 further includes a cap portion 321 and a grip 322, the lock member 33 includes a sleeve member 331, the sleeve member 331 is sleeved on the rotating rod 35 and received within the cap portion 321, the engaging portion 31 is radially disposed on the sleeve member 331, one end of the sleeve member 331 which is remote from the first rod member 91 extends to from an extension section 332 which is parallel to the grip 322, the extension section 332 is tapered toward a direction opposite to the cap portion 321, the user can grip the grip 322 and put his/her fingers between the extension section 332 and the first rod member 91 to trigger the lock member 33 to move toward the release position, then s/he can hold the grip 322 straightly to rotate the handle 32, and further control the engaging member 12 of the abutting assembly 1 to move between the first and second positions.

A bicycle carrier is further provided, including the foldable positioning structure, the bicycle carrier further includes a main body 9, the main body 9 includes the first rod member 91 and the second rod member 92 which are rotatably connected with each other, one of the first rod member 91 and the second rod member 92 has a carrier 93 for carrying a bicycle, and the other of the first rod member 91 and the second rod member 92 is assembled to a mounting rod of a vehicle. In this embodiment, the first rod member 91 is mounted on the mounting rod of the vehicle, the second rod member 92 has the carrier 93, and in other embodiments, the arrangement of the carrier and the mounting rod can exchange, not limited thereto.

Given the above, with the foldable positioning structure and the bicycle carrier including the same, before the user wants to swing the first rod member and the second rod member, s/he has to operate the controlling assembly to move to the released position to make the engaging portion detached from the second rod member so as to operate the controlling assembly to rotate and make the abutting assembly to move to the second position. Therefore, when the vehicle is on the road, the abutting assembly can be prevented from rotating the controlling assembly accidentally, so the first rod member and the second rod member will not swing relative to each other.

While we have shown and described various embodiments in accordance with the present invention, it should be clear to those skilled in the art that further embodiments may be made without departing from the scope of the present invention.

What is claimed is:

1. A foldable positioning structure, for being mounted on a main body of a bicycle carrier, the main body including a first rod member and a second rod member which are rotatably connected with each other, including:
   an abutting assembly, disposed on the second rod member and being movable relative to the second rod member to be on a first position or a second position;
   an elastic member, one of two ends thereof being engaged with one of the first rod member and the second rod member, the other of the two ends thereof being engaged with the abutting assembly so that the abutting assembly has a tendency to move toward the first position;
   a controlling assembly, rotatably disposed on the second rod member around an axis and being axially slidable relative to the second rod member to be on a locked position or a released position, the controlling assembly having an engaging portion which is radially disposed thereon; and
   a linkage, connected to and between the abutting assembly and the controlling assembly;
   wherein when the abutting assembly is on the first position, the abutting assembly is configured to be engaged with the first rod member to make the first rod member non-swingable relative to the second rod member; when the abutting assembly moves to the second position, the abutting assembly is disengaged from the first rod member so that the first rod member is swingable relative to the second rod member;
   wherein when the controlling assembly is on the locked position, the engaging portion is configured to be engaged with the second rod member, and controlling assembly is non-rotatable relative to the second rod member; when the controlling assembly moves to the released position, the engaging portion is disengaged from the second rod member, the controlling assembly is rotatable relative to the second rod member, and the controlling assembly is rotated to drive the linkage to make the linkage drive the abutting assembly to move to the second position.

2. The foldable positioning structure of claim 1, when the second rod member has a slot, the abutting assembly is disposed within the slot, the abutting assembly includes a connecting member and an engaging member, the engaging member is disposed through the connecting member and within the slot, the connecting member is respectively connected to the first elastic member and the linkage, and the engaging member is slidable to be on the first position or the second position to be optionally engaged with the first rod member.

3. The foldable positioning structure of claim 2, wherein the connecting member is U-shaped and has two first ear pieces, the linkage is pivoted to the two first ear pieces, and the first elastic member is connected to one end of the connecting member remote from the linkage.

4. The foldable positioning structure of claim 1, wherein the controlling assembly includes a handle and a lock member, the lock member has the engaging portion which is radially disposed thereon, the handle is rotatable relative to the second rod member around the axis, and the lock member is non-rotatably disposed within the handle and movable on the axis to be on the locked position and or released position.

5. The foldable positioning structure of claim 4, wherein the controlling assembly further includes a rotating member, the second rod member has a pivot hole, the rotating member is disposed through the pivot hole to be fixedly connected to the handle, and the linkage is connected to the rotating member.

6. The foldable positioning structure of claim 5, wherein the rotating member includes a rotating rod and a driving member, the rotating rod is disposed through the pivot hole and the driving member to be fixedly connected to the handle, the rotating rod is rotatable relative to the second rod member, the lock member is sleeved on the rotating rod, the driving member has two second ear pieces, and the two second ear pieces are pivoted to the linkage.

7. The foldable positioning structure of claim 5, wherein the pivot hole further has a notch, when the lock member is on the locked position, the engaging portion is received within the notch, when the lock member moves to the released position, the engaging portion is detached from the notch, and the lock member and the handle have a second elastic member therebetween to bias the lock member toward the locked position normally.

8. The foldable positioning structure of claim 6, wherein the handle further includes a cap portion and a grip, the lock member includes a sleeve member, the sleeve member is sleeved on the rotating rod and received within the cap portion, the engaging portion is radially disposed on the sleeve member, one end of the sleeve member which is remote from the first rod member extends to from an extension section which is parallel to the grip, and the extension section is tapered toward a direction opposite to the cap portion.

9. The foldable positioning structure of claim 3, wherein the controlling assembly includes a handle and a lock member, the lock member has the engaging portion, the handle is rotatable relative to the second rod member around the axis, and the lock member is non-rotatably disposed within the handle and movable on the axis to be on the locked position or the released position; the controlling assembly further includes a rotating member, the second rod member has a pivot hole, the rotating member is disposed through the pivot hole to be fixedly connected to the handle, and the linkage is connected to the rotating member; the rotating member includes a rotating rod and a driving member, the rotating rod is disposed through the pivot hole and the driving member to be fixedly connected to the handle, the rotating rod is rotatable relative to the second rod member, the lock member is sleeved on the rotating rod, the driving member has two second ear pieces, and the two second ear pieces are pivoted to the linkage; the pivot hole further has a notch, when the lock member is on the locked position, the engaging portion is received within the notch, when the lock member moves to the released position, the engaging portion is detached from the notch, and the lock member and the handle have a second elastic member therebetween to bias the lock member toward the locked position normally; the handle further includes a cap portion and a grip, the lock member includes a sleeve member, the sleeve member is sleeved on the rotating rod and received within the cap portion, the engaging portion is radially disposed on the sleeve member, one end of the sleeve member which is remote from the first rod member extends to from an extension section which is parallel to the grip, and the extension section is tapered toward a direction opposite to the cap portion; the first rod member has two side plates, the second rod member is pivoted to the two side plates via a first axle, one of the two ends of the first elastic member is connected to the first axle, each said side plate has at least two grooves, and when the engaging member is on the first position, the engaging member is received within one of the at least two grooves of the two side plates; the slot is a rectangular slot, and the engaging member is a rectangular rod; the rotating rod is a rectangular rod, one end of the rotating rod remote from the handle has a blocking member, and the blocking member abuts against one end of the second rod member remote from the handle; the linkage is a circular tube, and two ends of the linkage are respectively pivoted to the two first ear pieces and the two second ear pieces via a second axle.

10. A bicycle carrier, including the foldable positioning structure of claim 1, the bicycle carrier further including:

a main body, the main body including a first rod member and a second rod member which are rotatably connected with each other, one of the first rod member and the second rod member having a carrier for carrying a bicycle, the other of the first rod member and the second rod member being assembled to a mounting rod of a vehicle.

* * * * *